Patented July 12, 1927.

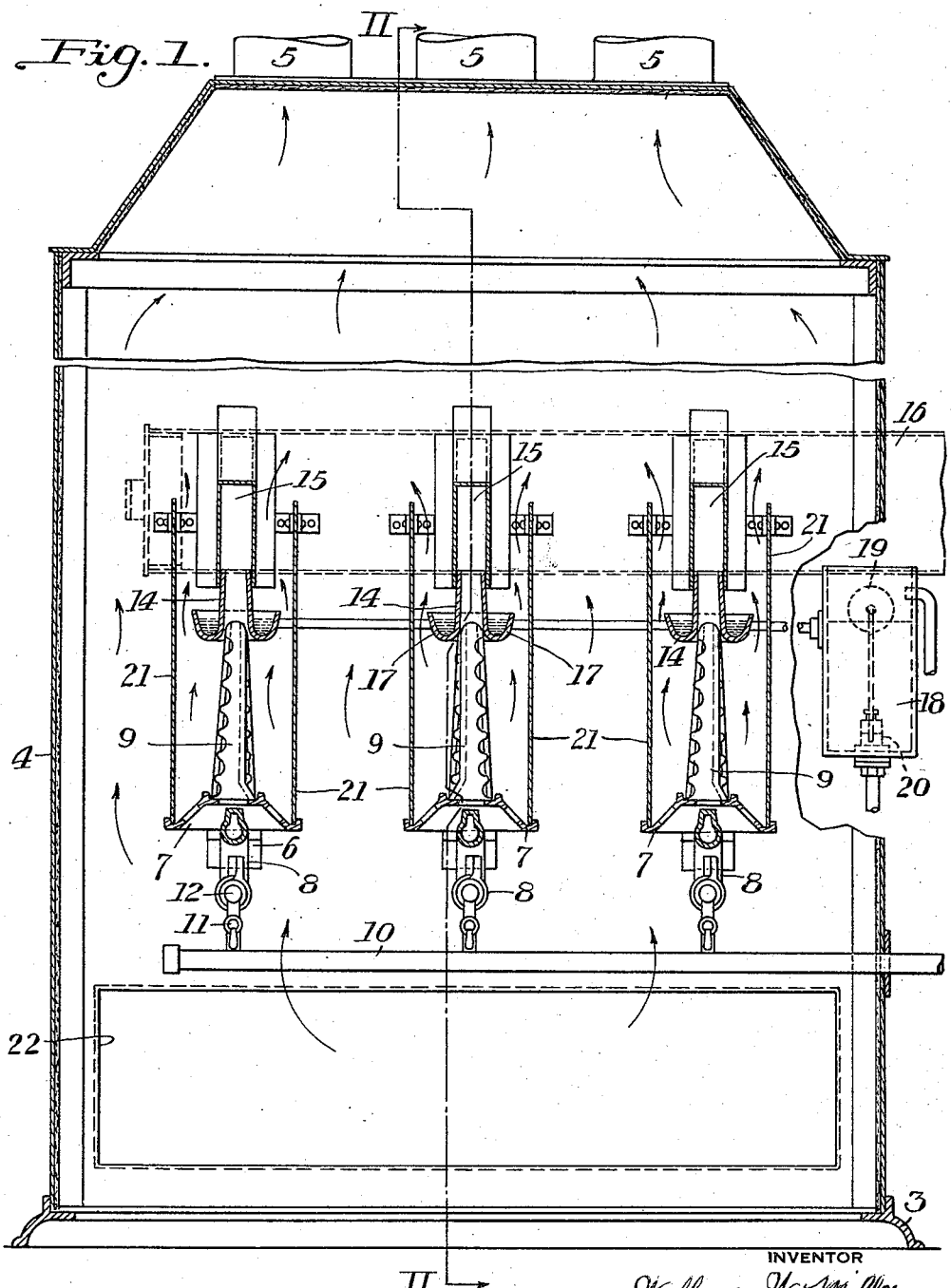

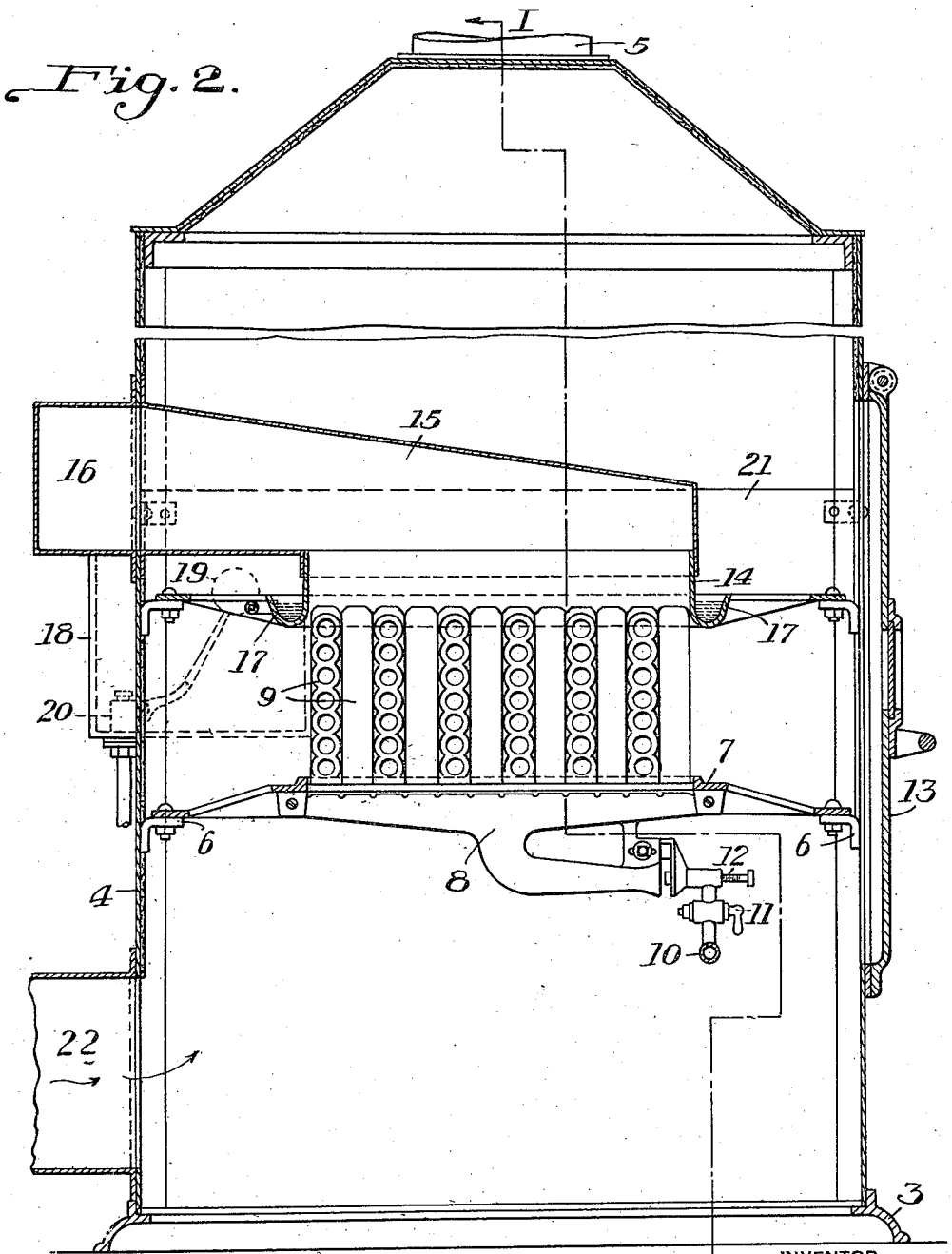

1,635,379

UNITED STATES PATENT OFFICE.

WALLACE W. MILLER, OF STEUBENVILLE, OHIO.

HEATING APPARATUS.

Application filed June 23, 1926. Serial No. 118,066.

My invention relates to heating apparatus, and particularly to apparatus wherein gaseous fuel is employed.

One object of my invention is to provide apparatus wherein the heat of gaseous fuel is more effectively utilized than is possible with devices heretofore employed, and wherein there is little loss of heat through the flue.

Another object of my invention is to provide heating apparatus of simplified and improved form.

One form which my invention may take is shown in the accompanying drawings wherein Figure 1 is a vertical sectional view of a furnace constructed in accordance with my invention, taken on the line 1—1 of Fig. 2; and Fig. 2 is a view taken on the line 2—2 of Fig. 1.

For convenience of illustration, I have shown the invention in its application to a domestic heating furnace of the hot air type, but it will be understood that it is applicable to various other forms of heating apparatus and systems.

In the drawing, I have shown a furnace which has a base portion 3, a body portion 4, and hot air outlets 5. At the sides of the furnace I secure angle bars 6 that serve as supports for three burner plates or brackets 7. A gas burner 8 is secured to each of the brackets 7. Upon each of the burner plates or brackets I mount a row of radiants or burner tubes 9 that may be constructed of suitable refractory material, in the usual manner, with openings in one side thereof. The tubes of each row alternately face in opposite directions, so that one-half of the tubes will direct radiant light rays to the left for example, while the other half of the tubes will direct the radiant light rays in the right hand direction.

The burners are supplied with gas from an inlet pipe 10 and are provided with the usual control and regulating valves 11 and 12. The burners are so disposed that the valves 11 and 12 are readily accessible from the furnace door 13 so that the proper adjustments can be readily made.

An elongated centrally perforated casting 14 is disposed above each row of tubes 9, for the purpose of conducting burnt gases to pipes 15 that communicate with a manifold 16 disposed at the rear side of the furnace. The manifold 16 is suitably connected to a chimney flue (not shown). The castings 14 are also provided with lip portions 17 that serve as water pans to humidify the air that passes through the furnace. Water is supplied to the pans by means of a gravity flow from a tank 18, the level of water in the tank being controlled by a float 19 that is connected to an inlet valve 20.

The burner brackets 7 are provided with flanges for supporting dark-colored metal plates 21 in a position to intercept the radiant light rays emitted by the burner tubes, and convert the same into heat waves. Cold air enters the furnace through a suitable inlet 22. Some of it is utilized for combustion while the main body thereof passes up and by either side of the plates 21 and becomes heated, and then passes off through the pipes 5. If no dark-colored plate or the like were placed in this position, those radiant light rays would continue to be reflected back and forth on the interior walls of the furnace, until they were absorbed, and then about one-half of the heat would be lost by radiation from the exterior surface of the furnace wall.

The heating action within the furnace is comparable to that which occurs between the earth and the sun, wherein the earth absorbs and converts into heat waves the light rays which pass from the sun through millions of miles of space and through the atmosphere which surrounds the earth.

As many burners as may be desired may be placed in a furnace and only certain burners need be utilized at given periods.

Not only is there efficient transfer of heat to the air, but little heat is lost through the draft to the flue, since the employment of radiants results in a more effective consumption of the fuel and the formation of but a relatively small amount of carbon monoxide, that is carried away through the reduced upper ends of the radiants and the vents 14.

It will be apparent that various changes in detail and general arrangement may be made without departing from the spirit and scope of the invention as defined in the accompanying claims.

I claim as my invention:

1. The combination with a fuel burner radiant, of a plate for absorbing light rays therefrom and means for directing a current of air between said radiant and the plate.

2. The combination with a fuel burner radiant, of a plate for absorbing light rays therefrom and means for directing a current of air into contact with the sides of said plate.

3. The combination with a plurality of burner radiants, of a plate for absorbing light rays therefrom between said radiants, and means for directing a current of air between said plate and the radiants.

4. The combination with a plurality of burner radiants, of a pair of laterally spaced plates for absorbing light rays therefrom between said radiants, and means for directing a current of air between said plates and between each of the plates and an adjacent radiant.

5. The combination with a row of burner radiants arranged to radiate rays in opposite directions, of a plate for absorbing light rays therefrom disposed at each side of said row, and means for directing currents of air between the radiants and said plates.

6. The combination with a plurality of burner radiants, of surfaces between said radiants for absorbing light rays emanating therefrom, and means for passing a heat absorbing medium between said surfaces.

In testimony whereof I the said WALLACE W. MILLER have hereunto set my hand.

WALLACE W. MILLER.